(12) United States Patent
Fujita

(10) Patent No.: US 11,804,974 B2
(45) Date of Patent: Oct. 31, 2023

(54) INFORMATION PROCESSING APPARATUS, MEETING SYSTEM, AND METHOD

(71) Applicant: Takehiro Fujita, Kanagawa (JP)

(72) Inventor: Takehiro Fujita, Kanagawa (JP)

(73) Assignee: Ricoh Company, Ltd., Tokyo (JP)

( * ) Notice: Subject to any disclaimer, the term of this patent is extended or adjusted under 35 U.S.C. 154(b) by 0 days.

(21) Appl. No.: 17/818,084

(22) Filed: Aug. 8, 2022

(65) Prior Publication Data
US 2023/0068678 A1 Mar. 2, 2023

(30) Foreign Application Priority Data

Aug. 31, 2021 (JP) .................................. 2021-141243
Jul. 21, 2022 (JP) .................................. 2022-116050

(51) Int. Cl.
*G06F 15/16* (2006.01)
*H04L 12/18* (2006.01)

(52) U.S. Cl.
CPC ...... *H04L 12/1818* (2013.01); *H04L 12/1831* (2013.01)

(58) Field of Classification Search
None
See application file for complete search history.

(56) References Cited

U.S. PATENT DOCUMENTS

| | | | | |
|---|---|---|---|---|
| 2008/0178297 A1* | 7/2008 | Ikeda | ...................... | G06Q 10/10 726/28 |
| 2018/0052837 A1* | 2/2018 | Kunieda | .................. | G06F 16/40 |
| 2018/0060289 A1 | 3/2018 | Grueneberg et al. | | |
| 2018/0101824 A1* | 4/2018 | Nelson | ............... | G06Q 10/1095 |
| 2018/0284907 A1* | 10/2018 | Kolahdouzan | ........ | G06F 3/0484 |
| 2019/0012614 A1* | 1/2019 | Yamada | ................... | H04L 67/12 |
| 2019/0108221 A1* | 4/2019 | Nelson | ..................... | G10L 15/26 |
| 2019/0108492 A1* | 4/2019 | Nelson | ............... | G06Q 10/1095 |
| 2019/0108493 A1* | 4/2019 | Nelson | ............... | G06Q 10/1095 |
| 2019/0273767 A1* | 9/2019 | Nelson | ................ | H04M 7/0027 |
| 2019/0303827 A1* | 10/2019 | Hashimoto | ............ | G06Q 10/02 |
| 2019/0361935 A1* | 11/2019 | Muniz Navarro | ...... | H04L 67/30 |

FOREIGN PATENT DOCUMENTS

| | | | | |
|---|---|---|---|---|
| JP | 2006-146415 | | 6/2006 | |
| JP | 2010-176603 | | 8/2010 | |
| JP | 2014-048837 | | 3/2014 | |
| JP | 2017-220895 | | 12/2017 | |
| WO | WO-2018135892 A1 * | 7/2018 | ............. | G06F 17/18 |

OTHER PUBLICATIONS

Extended European Search Report for 22187932.3, dated Jan. 23, 2023.

* cited by examiner

*Primary Examiner* — Phyllis A Book
(74) *Attorney, Agent, or Firm* — IPUSA, PLLC

(57) ABSTRACT

An information processing apparatus, a meeting system, and a method. The information processing apparatus registers material to be distributed to a participant of a meeting, controls an output device to output the material, acquires meeting progress information indicating progress of the meeting and additional information added by the participant to the material, and generates meeting result information that indicates meeting result based on the material, the meeting progress information, and the additional information.

12 Claims, 17 Drawing Sheets

FIG. 5

| ITEM | DESCRIPTION | EXAMPLE |
|---|---|---|
| MEETING DATE | DATE TO HOLD MEETING | MMDD20YY |
| MEETING START TIME | PLANNED TIME TO START MEETING | 13:30 |
| MEETING CLOSE TIME | PLANNED TIME TO CLOSE MEETING | 14:00 |
| MEETING PARTICIPANT INFORMATION | INFORMATION SUCH AS NAME, ID, E-MAIL ADDRESS OF PARTICIPANT | ICHIRO TANAKA (A1111), JIRO SATOH (B2222), SABURO NAKAMURA (C3333) |
| LINK WITH ACCESS CONTROL SYSTEM | WHETHER TO CONTROL ACCESS OF PARTICIPANT (WHEN LINKED, WRITER IS IDENTIFIED BY COLLECTING MATERIAL WITH IDENTIFICATION OF PARTICIPANT PRINTED) | YES/NO |
| MEETING MATERIAL | ELECTRONIC FILE OF MATERIAL TO BE USED IN MEETING (PRINTED OR PROJECTED MATERIAL USED IN MEETING) | DATA IN FILE FORMAT SUCH AS PDF |

FIG. 7

| ITEM | DESCRIPTION | EXAMPLE |
|---|---|---|
| PARTICIPANT ID | ID TO IDENTIFY MEETING PARTICIPANT | A1111 |
| PARTICIPANT NAME | NAME OF PARTICIPANT | ICHIRO TANAKA |

FIG. 8

| ITEM | DESCRIPTION | EXAMPLE |
|---|---|---|
| MEETING TIME | TIME SPENT FOR MEETING (TIME SPENT PER PAGE) | 30 MIN (PAGE 1: 6 MIN, PAGE 2: 3 MIN, PAGE 3: 12 MIN, PAGE 4: 9 MIN) |
| PARTICIPANT | PERSON ACTUALLY PARTICIPATED IN MEETING | ICHIRO TANAKA (A1111), JIRO SATOH (B2222) |
| MEETING VOICE | VOICE DATA RECORDED IN MEETING | DATA IN FILE FORMAT SUCH AS MP3 AND THE LIKE |

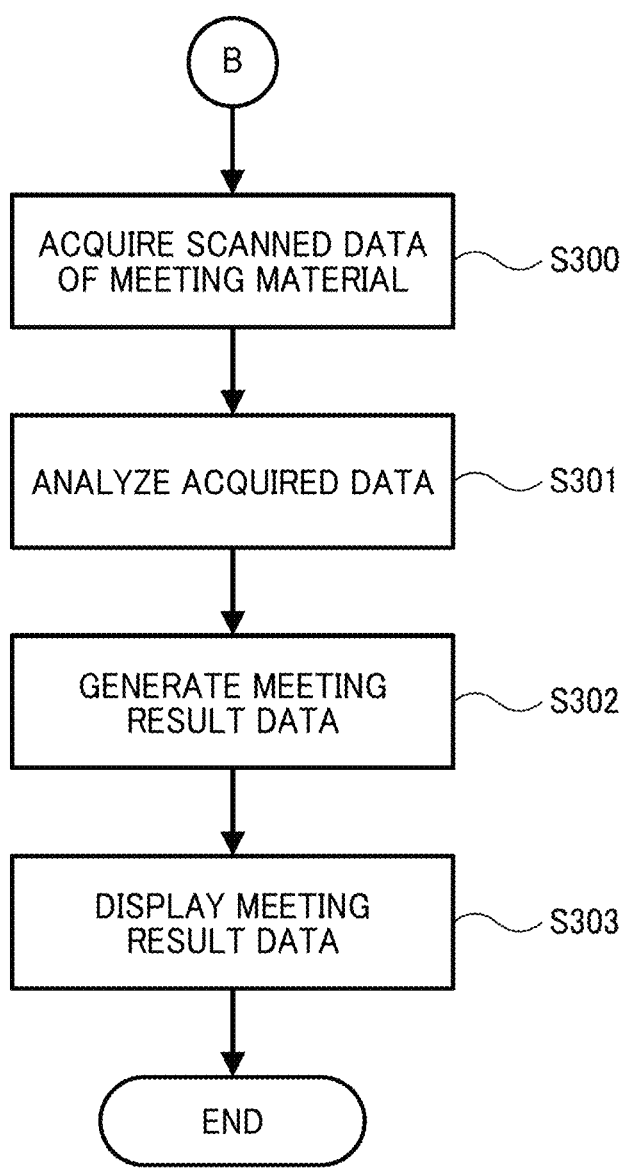

FIG. 10

| ITEM | DESCRIPTION | EXAMPLE |
|---|---|---|
| MEETING TIME | TIME SPENT FOR MEETING | 30 MIN |
| PARTICIPANT ATTENDANCE LIST | LIST OF ATTENDANCE OF PARTICIPANT | ICHIRO TANAKA (A1111): PRESENT<br>JIRO SATOH (B2222): PRESENT<br>SABURO NAKAMURA (C3333): ABSENT |
| MEETING PROGRESS DATA | DATA INDICATING TIME SPENT ON EACH PAGE OF MEETING MATERIAL BASED ON ANALYSIS ON EACH PAGE OF MEETING MATERIAL | 30 MIN<br>(PAGE 1: 6 MIN, PAGE 2: 3 MIN,<br>PAGE 3: 12 MIN, PAGE 4: 9 MIN)<br>(PAGE 1: 20%, PAGE 2: 10%,<br>PAGE 3: 40%, PAGE 4: 30%) |
| EXTRACTION OF WRITTEN CONTENT | DATA SUMMARIZING CONTENT WRITTEN BY PARTICIPANT ON EACH PAGE OF MEETING MATERIAL BASED ON ANALYSIS ON EACH PAGE OF MEETING MATERIAL | DATA IN IMAGE FILE FORMAT SUCH AS JPEG, DATA IN TEXT FORMAT INCLUDING EXTRACTED WRITTEN CONTENT |
| MEETING VOICE | VOICE DATA RECORDED IN MEETING, DATA INDICATING RELATION WITH MEETING VOICE OF EACH PAGE OF MEETING MATERIAL OF PARTICIPANTS ANALYZED FROM MEETING DATA | DATA IN FILE FORMAT SUCH AS MP3 AND THE LIKE<br>PAGE 1: DEGREE OF DISCUSSION LOW<br>PAGE 2: DEGREE OF DISCUSSION LOW<br>PAGE 3: DEGREE OF DISCUSSION HIGH<br>PAGE 4: DEGREE OF DISCUSSION MEDIUM |

INFORMATION PROCESSING APPARATUS, MEETING SYSTEM, AND METHOD

CROSS-REFERENCE TO RELATED APPLICATIONS

This patent application is based on and claims priority pursuant to 35 U.S.C. § 119(a) to Japanese Patent Applications No. 2021-141243, filed on Aug. 31, 2021, and No. 2022-116050, filed on Jul. 21, 2022 in the Japan Patent Office, the entire disclosure of which is hereby incorporated by reference herein.

BACKGROUND

Technical Field

The present disclosure relates to an information processing apparatus, a meeting system, and a method.

Related Art

A meeting is conducted according to content of material distributed to participant of the meeting. The participant speak about the content, underline points of interest, and write down content explained by an organizer. A part of the material that the participant spoke about and wrote down is an important part or a part that the participant is interested in, and the meeting organizer may utilize content of speech and writing for future document preparation and how to proceed with the meeting.

SUMMARY

Embodiments of the present disclosure describe an information processing apparatus, a meeting system, and a method. The information processing apparatus registers material to be distributed to a participant of a meeting, controls an output device to output the material, acquires meeting progress information indicating progress of the meeting, and additional information added by the participant to the material, and, generates meeting result information that indicates meeting result based on the material, the meeting progress information, and the additional information.

BRIEF DESCRIPTION OF THE DRAWINGS

A more complete appreciation of the disclosure and many of the attendant advantages and features thereof can be readily obtained and understood from the following detailed description with reference to the accompanying drawings, wherein:

FIG. 5 is a diagram illustrating an example of meeting information registered at the time of holding a meeting;

FIG. 7 is a diagram illustrating an example of meeting participant information;

FIG. 8 is a diagram illustrating an example of meeting progress data acquired during the meeting;

FIG. 9 is a flowchart illustrating an example of a process executed by the meeting support system after the meeting;

FIG. 10 is a diagram illustrating an example of meeting result information;

Figure 1:
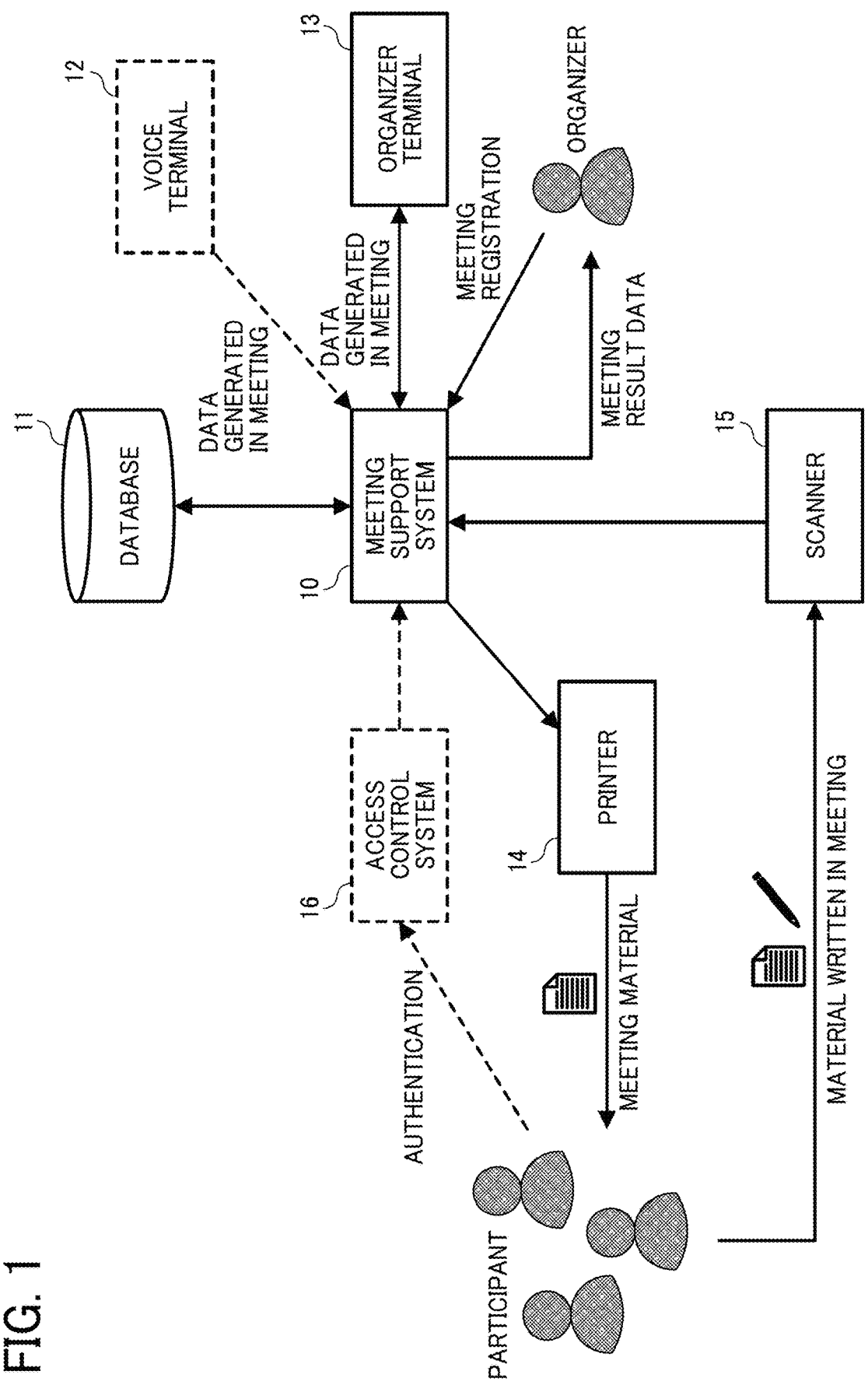
FIG. 1 is a diagram illustrating a first example of a configuration of a meeting system.

The accompanying drawings are intended to depict embodiments of the present invention and should not be interpreted to limit the scope thereof. The accompanying drawings are not to be considered as drawn to scale unless explicitly noted. Also, identical or similar reference numerals designate identical or similar components throughout the several views.

DETAILED DESCRIPTION

In describing embodiments illustrated in the drawings, specific terminology is employed for the sake of clarity. However, the disclosure of this specification is not intended to be limited to the specific terminology so selected and it is to be understood that each specific element includes all technical equivalents that have a similar function, operate in a similar manner, and achieve a similar result.

Referring now to the drawings, embodiments of the present disclosure are described below. As used herein, the singular forms "a," "an," and "the" are intended to include the plural forms as well, unless the context clearly indicates otherwise.

Hereinafter, the present disclosure is described with reference to embodiments, but the present disclosure is not limited to the embodiments described below.

FIG. 1 is a diagram illustrating a first configuration example of a meeting system. The meeting system manages a date and time of a meeting, participant, and the like, registers a material for the meeting, outputs and provides the material to the participant, obtains content of writing from the participant, and generates and provides meeting result information to an organizer.

The meeting system includes an information processing apparatus for generating the meeting result information and supporting the meeting. Hereinafter, the information processing apparatus is referred to as the meeting support system. A database 11 for storing the material for the meeting is connected to a meeting support system 10. The material for the meeting is stored in the database 11 in association with the meeting information including information such as the date and time of the meeting and the participants, or included in the meeting information. In the present embodiment, the database 11 is provided separately from the meeting support system 10, but the present disclosure is not limited to this configuration and a storage device in the meeting support system 10 may be used as the database 11.

The meeting support system 10 is connected to a voice terminal 12 for recording speeches of the organizer and participant of the meeting during the meeting. The voice terminal 12 is, for example, a microphone. The meeting support system 10 is connected to an organizer terminal 13, a printer 14 as an output device, a scanner 15 as a reading device and an access control system 16 by a cable or through a network. The meeting support system 10 is connected to a camera, a smart device with a camera, or the like by wire or wirelessly. Examples of the smart device include a smartphone, a tablet terminal, a notebook personal computer (PC), a personal digital assistant (PDA) and the like.

The meeting organizer is a person who holds the meeting, and uses the meeting support system 10 to register the meeting information together with material data. The material data is data of the material used in the meeting, which is printed on a recording medium such as paper and distributed to the participant of the meeting as the meeting material. The participants are those who participate in the meeting held by the organizer, and write on the distributed meeting materials using a writing tool such as a pen during the meeting. The voice terminal 12 acquires speeches of the organizer and the participant as in-meeting data (voice data). The voice data is used to summarize the meeting result.

The organizer terminal is a terminal used by the organizer and is an example of an information terminal. Examples of the organizer terminal 13 includes the PC, the tablet terminal, the smartphone, or the like. The organizer uses the organizer terminal 13 to acquire meeting progress information (meeting progress data) indicating progress of the meeting as in-meeting data from the meeting support system 10. The meeting progress data is data such as how much time is spent on which part (section or page) of the meeting material.

The printer 14 prints the registered material data according to an instruction from the meeting support system 10. The printed material is distributed to the participant. The scanner 15 scans the meeting material with writing by the participant during the meeting after the meeting, and transmits scan data to the meeting support system 10. In the case the camera or the smart device with the camera is used, the meeting material is photographed by the camera or the like after the fleeting, and the photograph data is transmitted to the meeting support system 10.

The access control system 16 identifies the participant who enters the meeting room in which the meeting is held. The access control system 16 authenticates the participant by comparing the participant identification information that the participant inputs when entering the meeting room, or read from an integrated circuit (IC) card, smartphone, etc. possessed by the participant with the participant identification information registered in advance. Therefore, the access control system 16 includes an input device for inputting participant identification information or a reading device for reading participant identification information. The participant identification information includes a participant identifier (ID) and password for authentication. The participant identification information may be biological information such as a participant's fingerprint or vein.

The organizer who intends to hold the meeting inputs the meeting information. At this time, the organizer designates the material data to be used for the meeting. The meeting support system 10 supports the meeting in cooperation with peripheral devices such as the voice terminal 12, the printer 14, the scanner 15, and the access control system 16. The meeting support system 10 registers the meeting information input by the organizer and the designated material data in the database 11 before the meeting.

The meeting support system 10 reads the material data from the database 11 and instructs the printer 14 to print the material data in order to distribute the meeting material to the participant authenticated by the access control system 16. The printer 14 prints the instructed material data for distribution to the meeting material to the participant. A code for identifying the participant is provided to the material data, and the code provided to the material is also printed. The code may be either a one-dimensional code or a two-dimensional code, or may be another code. Information to identify the participant is not limited to the code, and may be an employee number or the like that identifies the participant.

Further, a material identification code that uniquely identifies the material may be printed on the material data. In addition, a page identification code may be printed to identify each page of the material. The code for identifying the participant, the material identification code, and the page identification code may be separate codes, or two or more codes may be combined into one code. The material identification code and the page identification code may be either a one-dimensional code or a two-dimensional code, or may be other codes, like the code for identifying the participant. Further, as long as the material or page is identified, the identification is not limited to the code and may be a meeting name, a page number, or the like.

In FIG. 1, the meeting system is linked with the meeting support system 10 and the access control system 16. The meeting support system 10 is configured to acquire participant information from the access control system 16. In another example of the meeting system, the meeting support system 10 and the access control system 16 may not be linked, or the access control system 16 may not be provided. In this case, the meeting support system 10 receives the input of the participant identification information from the participant, executes the authentication process. In response to receiving a print request from the participant, the printer 14 is instructed to print the material data of the meeting corresponding to the participant.

During the meeting, the organizer of the meeting displays each part of the material on a screen or the like from the organizer terminal 13 through a display or a projector to explain content of the material. The meeting support system 10 acquires meeting progress data such as time spent on each part of the meeting, and transmits the meeting progress data to the organizer terminal 13 in response to a request from the organizer terminal 13. In the case the part is a page of the material, the time from displaying that page to moving to the next page is measured and acquired as the time spent for that part.

After the meeting, the meeting support system 10 receives the meeting material read by the scanner 15 as scan data and generates the meeting result information (meeting result data) based on the registered material data, meeting progress data, and received scan data. In another example, the meeting support system 10 receives meeting material captured by the camera or the smart device as shooting data and generates the meeting result data based on the registered material data, the meeting progress data, and the received shooting data. After generating the meeting result data, the meeting support system 10 notifies the organizer of the meeting result. The meeting result is notified by displaying the meeting result data on a screen of a display device of the meeting support system 10.

The meeting result data is summarized information that correlates difference information between the original material data and the scan data or shooting data including the writing by the participant with the progress status such as the time spent on each part of the meeting, based on the meeting progress data. As a result, utilization of the difference information as the additional information added at the meeting is improved.

Figure 2:
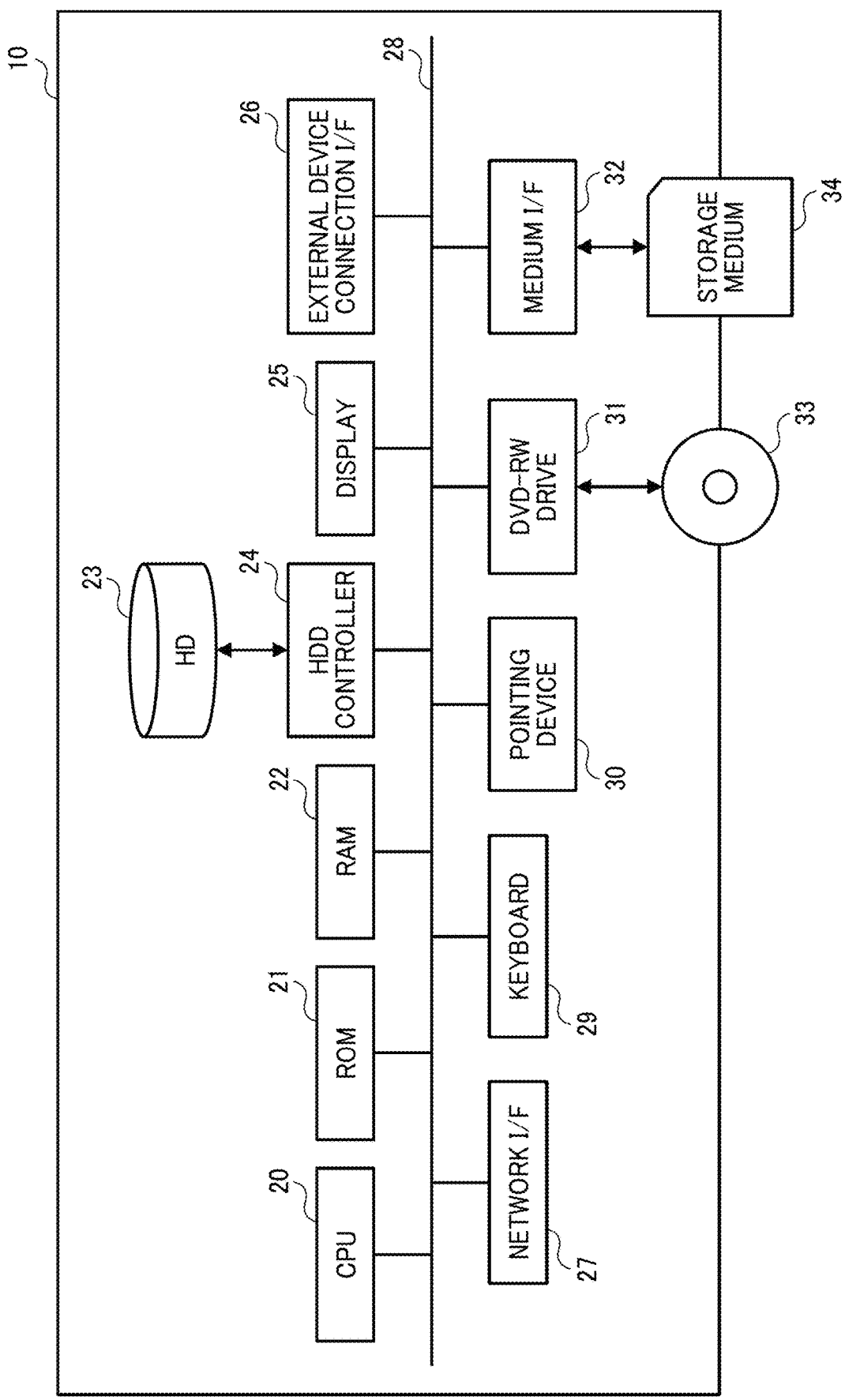
FIG. 2 is a diagram illustrating an example of a hardware configuration of an information processing apparatus as a meeting support system.

With reference to FIG. 2, the hardware configuration of the meeting support system 10 is described. The meeting support system 10 is implemented by a general computer, and includes a central processing unit (CPU) 20, a read only memory (ROM) 21, a random access memory (RAM) 22, a hard disk (HD) 23, a hard disk drive (HDD) controller 24, and a display 25. The meeting support system 10 further includes an external device connection interface (I/F) 26, a network I/F 27, a data bus 28, a keyboard 29, a pointing device 30, a Digital Versatile Disk Rewritable (DVD-RW) drive 31, and a medium I/F 32.

The CPU 20 controls the operation of the entire meeting support system 10. The ROM 21 stores programs such as an initial program loader (IPL) to boot the CPU 20. The RAM 22 provides a working area for the CPU 20. The HD 23 stores various data such as programs. The HDD controller 24 controls reading and writing of various data from and to the HD 23 according to the control of the CPU 20. The display 25 displays various information such as a cursor, menu, window, characters, or image.

The external device connection I/F 26 is an interface for connecting various external devices. Examples of the external devices include a Universal Serial Bus (USB) memory and a printer. The network I/F 27 is an interface for communicating data using the network. The data bus 28 is an address bus, a data bus, or the like for electrically connecting each component such as the CPU 20.

The keyboard 29 is one example of an input device provided with a plurality of keys for enabling a user to input characters, numerals, or various instructions. The pointing device 30 is an example of the input device that allows a user to select or execute a specific instruction, select a target for processing, or move a cursor being displayed. The DVD-RW drive 31 controls reading or writing of various data to a DVD-RW 33 which is an example of a removable recording medium. Here, DVD-RW 33 is taken as an example, but the present disclosure is not limited to the DVD-RW, and a Digital Versatile Disk Recordable (DVD-R) or the like may be used. The medium I/F 32 controls reading or writing of data from and to a storage medium 34 such as a flash memory.

Figure 3:
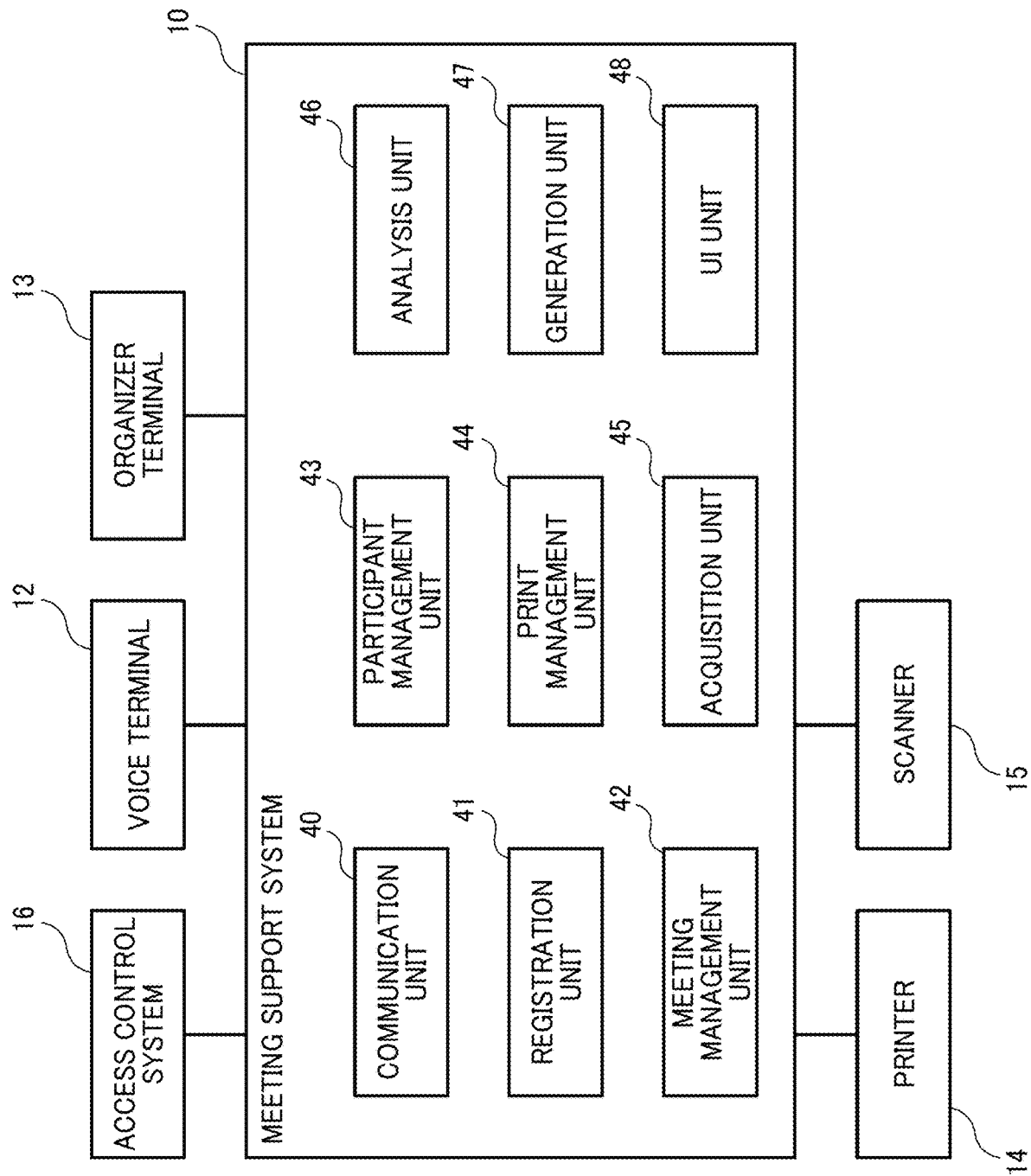
FIG. 3 is a block diagram illustrating an example of a functional configuration of the meeting support system.

With reference to FIG. 3, a functional configuration of the meeting support system 10 is described below. Each function included in the meeting support system 10 is implemented by a processing circuit such as a CPU 20.

The meeting support system 10 is connected to peripheral devices such as the voice terminal 12, the organizer terminal 13, the printer 14, the scanner 15, and the access control system 16.

The meeting support system 10 includes a communication unit 40, a registration unit 41, a meeting management unit 42, a participant management unit 43, a print management unit 44, an acquisition unit 45, an analysis unit 46, a generation unit 47, and a user interface (UI) unit 48 as functional units for implementing each function.

The communication unit 40 controls communication with the peripheral devices. The registration unit 41 registers the meeting information input by the organizer in the database 11. The meeting management unit 42 manages the registered meeting information and updates the meeting information. The participant management unit 43 manages the information of the participant who participate in the meeting, and adds or deletes the participant.

The print management unit 44 controls the printing of material to be distributed to the participant of the meeting. The print management unit 44 acquires the information of the participant identified by the access control system 16, identifies the meeting in which the participant participates, and instructs the printer 14 to print the material of the identified meeting. At that time, the print management unit 44 instructs to print the code of the participant together with the material. Further, a material identification code that identifies the material of the meeting and a page identification code that identifies each page of the material may be instructed to be printed.

The acquisition unit 45 acquires various data during the meeting. The various data include data such as meeting progress data, participant data, voice data, and the writing by participant on the meeting material. The analysis unit 46 analyzes various data acquired by the acquisition unit 45. The analysis unit 46 analyzes the difference, such as time spent for each part of the material, participant in the meeting, the number of speeches in each part, writing, and the like. The generation unit 47 generates meeting result data based on the analysis result of the analysis unit 46. The meeting result data is, for example, a pie chart or the like indicating ratio of each part to all the parts when the analysis result is the time spent for each part. The UI unit 48 provides a user who operates the system with a screen for operating the system.

The processes executed by the meeting support system 10 is described with reference to FIGS. 4 to 10. Since the processes executed by the meeting support system 10 are divided into before the meeting, during the meeting, and after the meeting, each process is described individually.

Figure 4:
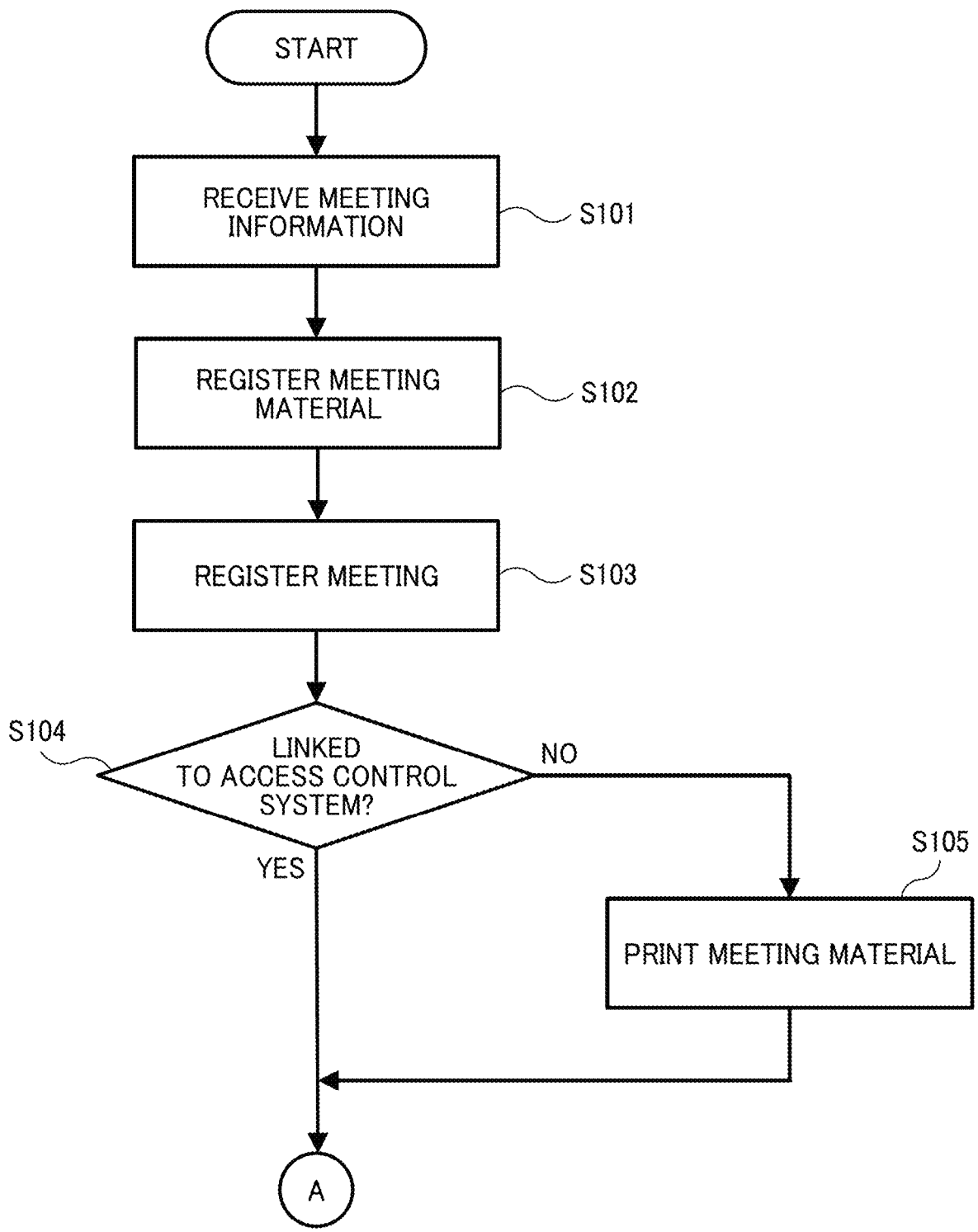
FIG. 4 is a flowchart illustrating an example of a process executed by the meeting support system before a meeting is held.

With reference to FIG. 4, the process before the meeting is described. The meeting organizer starts the process by displaying a screen for registering the meeting information on the meeting support system 10. In step S101, the meeting organizer inputs the meeting information and the meeting support system 10 receives the input.

FIG. 5 is a diagram illustrating an example of meeting information stored in the database 11. The meeting information is stored in the database 11, for example, in a table. Items to be stored in the table include a meeting date, meeting start time, meeting close time, meeting participant information, link with the access control system 16, meeting material, and the like, and descriptions of the items and example are associated with each other. In FIG. 5, example of data is indicated as the example.

The meeting start time is the time when the meeting is planned to start, and the meeting close time is the time when the meeting is planned to close. The meeting participant information is information such as the name, ID, and e-mail address of a person who participates in the meeting. Link with the access control system 16 indicates whether to link with the access control system 16 when connection is available.

Referring back to FIG. 4, in step S102, the registration unit 41 of the meeting support system 10 registers the material prepared for the meeting in the database 11. The registration of the material includes registration of address information indicating a storage location where the material is stored, a file name of material data, and the like. In step S103, the meeting support system 10 registers a meeting by storing the received meeting information in association with the material or includes the material in the meeting information in the database 11.

In step S104, the meeting support system 10 determines whether the access control system 16 is linked. Based on a determination that the access control system is not linked, the process proceeds to step S105, and the print management unit 44 instructs the printer 14 to output the material data. The meeting organizer receives the printed material and distributes the printed material to the participant. In the case the access control system is not linked, an individual participant is not identified from the collected material. Based on a determined in step S104 that the access control system is linked, or after printing the material data in step S105, the process proceeds to A and the process proceeds to the process during the meeting, in response to a selection of the registered meeting.

Figure 6:
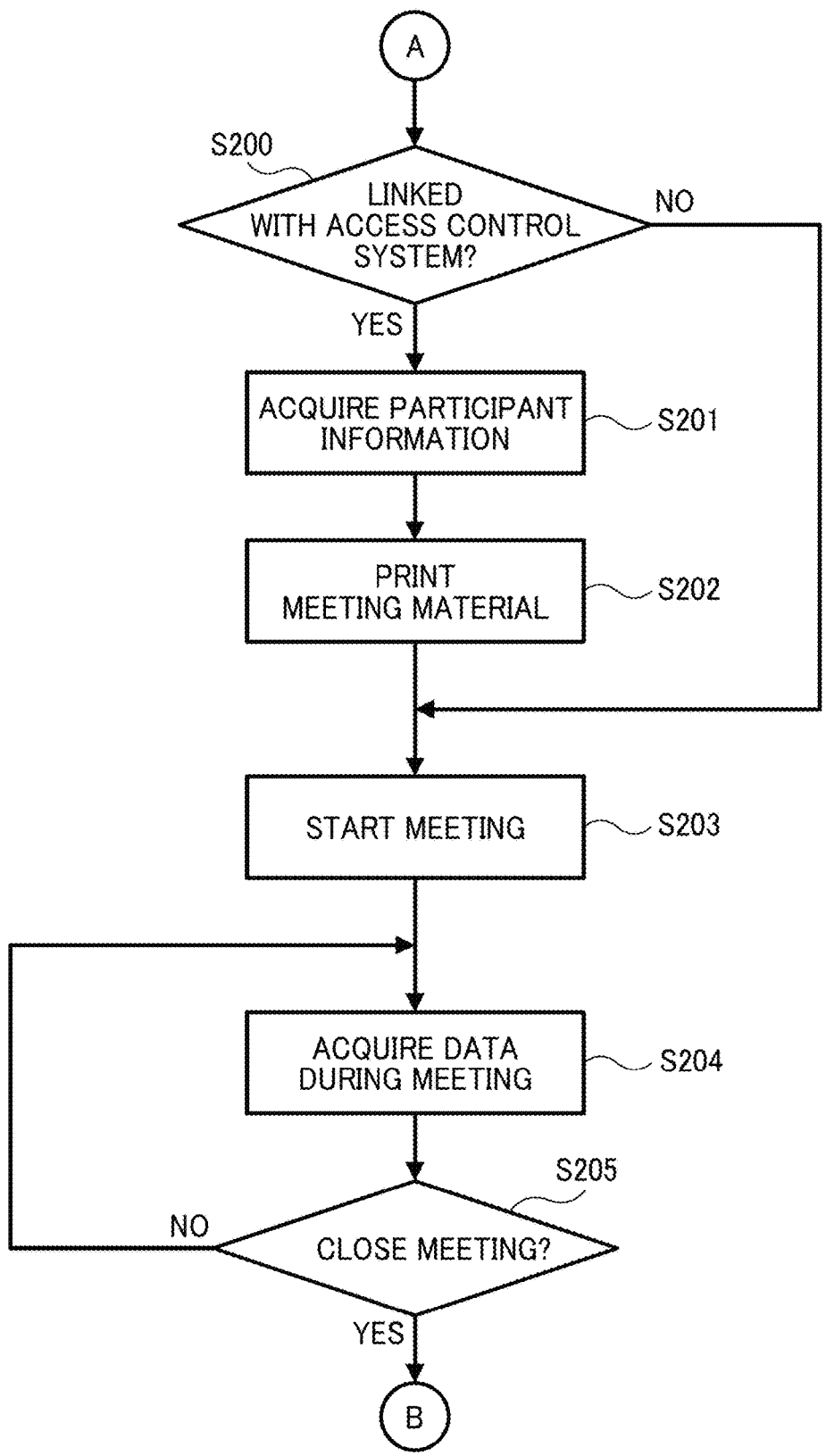
FIG. 6 is a flowchart illustrating an example of a process executed by the meeting support system during the meeting.

With reference to FIG. 6, the process during the meeting is described in the following. When the process proceeds from A to the process during the meeting, the meeting support system 10 determines again whether the access control system 16 is linked in step S200. Based on a determination that the access control system 16 is linked, the process proceeds to step S201, and participant information is acquired from the access control system 16.

FIG. 7 is a diagram illustrating an example of meeting information stored in the database 11. The participant information is stored, for example, in a table. The table stores a participant ID and a participant name as items to be stored, and description and example are associated with these items. The participant ID is used in the authentication process. A password is not included in this table, but may be included and stored together.

Referring back to FIG. 6, in step S202, the meeting support system 10 adds a code or the like for identifying an individual to the participant at the time of collecting the material, and prints the material data. Participant receives the printed material and waits for the meeting to start.

Based on a determination in step S200 that the access control system is not linked, the participant is allowed to enter the meeting room and waits for the start of the meeting, since the organizer has already distributed the material to the participant in step S105 illustrated in FIG. 4.

In response to a start of the meeting in step S203, the process proceeds to the process during the meeting, and the meeting support system 10 acquires the information (data) during the meeting in step S204. The data during the meeting acquired here is the voice data of the meeting, the meeting progress data indicating the time spent in each part of the meeting, and the like. FIG. 8 is a diagram illustrating an example of information acquired during the meeting. The information is stored, for example, in a table. The table stores meeting time, participant, meeting voice, description of each item and example of each item in association with each other. The meeting time is actual time spent for the meeting, and is the time actually spent for each part (for example, each page) of the meeting. In FIG. 8, PAGE 1 to PAGE 4 indicate page numbers. Participant is a person actually participated in the meeting, and the meeting voice is data obtained by recording the voice during the meeting.

Referring back to FIG. 6, in step S205, the meeting support system 10 determines whether to close the meeting, and based on a determination not to close the meeting, returns the process to step S204, and based on a determination to close the meeting, proceeds the process to B and proceeds to the process after the meeting.

With reference to FIG. 9, the process after the meeting is described. The meeting support system 10 proceeds the process from B to the process after the meeting, and the acquisition unit 45 acquires the scan data of the meeting material in step S300. Here, the scan data obtained by scanning the meeting material with the scanner 15 is acquired, but the acquired data may be shooting data taken by the camera or the smart device. The scan data acquired here may be scan data of the meeting materials of all the participants who participated in the meeting, or may be scan data of the meeting materials that are collected.

In step S301, the information acquired in step S204 during the meeting and the scan data acquired in step S300 are analyzed such as a part of the meeting is associated with the time spent for that part and voice data, and additional information written on the material is extracted. At this time, in the case the material identification code or the page identification code is printed, the difference is identified by using these codes. Specifically, the material identified by the material identification code is identified. Then the page of the material is identified by the page identification code that identifies the page. The difference between the data of the identified page of the identified material and the acquired scan data is extracted. Then, the extracted difference is identified as additional information. In step S302, the generation unit 47 generates the meeting result data based on the analysis result.

FIG. 10 is a diagram illustrating an example of meeting result data. The meeting result data is generated, for example, in a table. The table stores items such as meeting time, participant attendance list, meeting progress data, extraction of written content, meeting voice, description of each item, and example of each item in association with each other.

The meeting time is obtained from the information acquired during the meeting illustrated in FIG. 8. The participant attendance list is obtained from the meeting information illustrated in FIG. 5 and the information illustrated in FIG. 8. The meeting progress data is obtained from the time spent for each part of the information illustrated in FIG. 8. The difference between the content of the material distributed by the analysis of each part of the meeting material and the content of the material collected after the meeting is extracted as the extraction of written content. The writing is, for example, "XXX is unknown . . . " or the like. In the meeting voice, voice data is extracted for each part of the meeting material of each participant in the meeting analysis, and for example, information indicating the degree of discussion ("high", "medium", "low") is associated with the meeting voice. The degree of discussion is determined, for example, by the number of speeches.

Referring back to FIG. 9, in step 303, the meeting result data is displayed and the meeting result is notified to the organizer. The process after the meeting ends upon completion of the notification.

The meeting support system 10 displays on the display, the screen for registering meeting information and the like, registers meeting information and the like according to the displayed screen, and displays the meeting result data on the screen. Referring to examples of the screen displayed in each process, individual process such as the registration of meeting information is described in detail.

Figure 11:
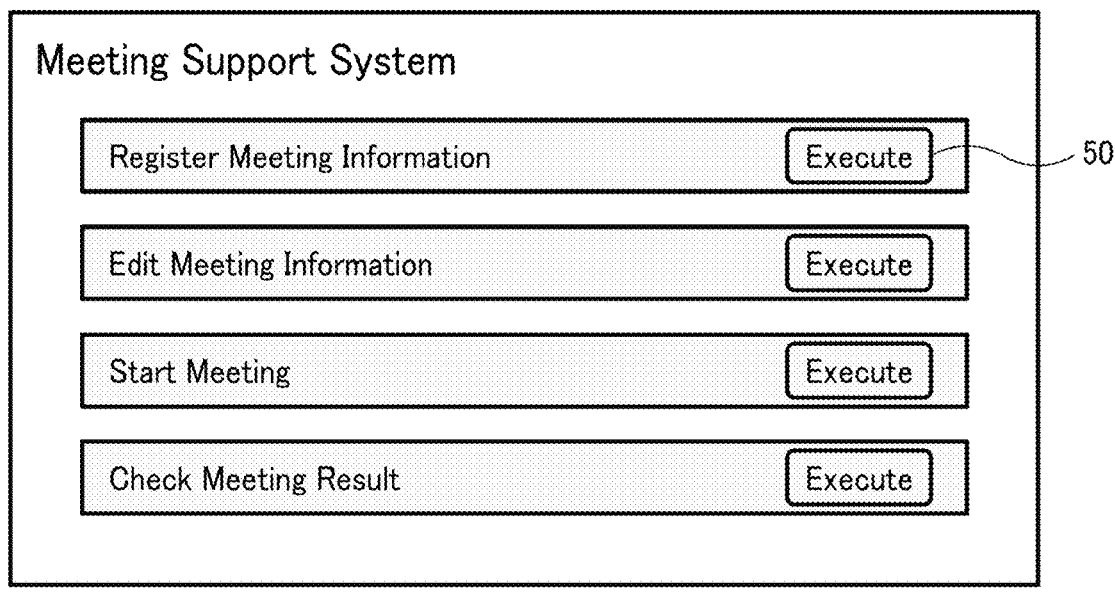
FIG. 11 is a diagram illustrating a first example of a screen displayed by the meeting support system.

FIG. 11 is a diagram illustrating a first example of a screen displayed on the meeting support system. This screen is a top screen of the meeting support system. The meeting support system displays the top screen in response to a login by the organizer. The organizer uses each function by selecting a menu displayed on the top screen. Examples of the functions displayed in the menu include "Register Meeting Information", "Edit Meeting Information", "Start Meeting", and "Check Meeting Result", but the functions are not limited to these menus. Each function is provided with an Execute button 50 for selecting and executing the function.

Figure 12:
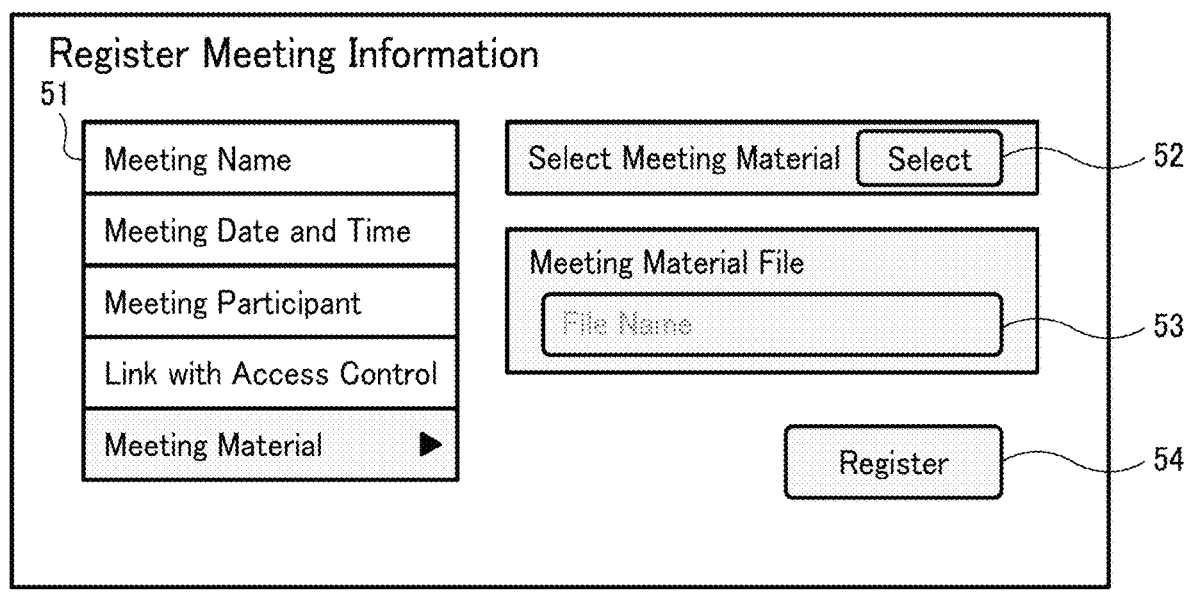
FIG. 12 is a diagram illustrating a second example of the screen displayed by the meeting support system.

FIG. 12 is a diagram illustrating a second example of the screen displayed on the meeting support system. This screen is displayed by pressing the Execute button 50 corresponding to "Register Meeting Information" in the menu illustrated in FIG. 11. In the "Register Meeting Information" screen, "Meeting Name", "Meeting Date and Time", "Meeting Participant", "Link with Access Control", and "Meeting Material" are registered. On the screen illustrated in FIG. 12, an item list 51 is displayed to select an item to input information.

In the example illustrated in FIG. 12, "Meeting Material" is selected from the item list 51, and in response, a Select button 52 for selecting the material data of the meeting material, an input field 53 for inputting the file name of the material data, and a Register button 54 are displayed.

In response to selecting "Edit Meeting Information" in the menu illustrated in FIG. 11, the item list 51 and the registered content are displayed as illustrated as an example in FIG. 12. In response to selecting "Meeting Material" in the item list 51, the registered material data and file name are displayed. After editing by, for example, selecting another material data, changing the file name, or the like, the edited content is registered by pressing the Register button 54.

Figure 13:
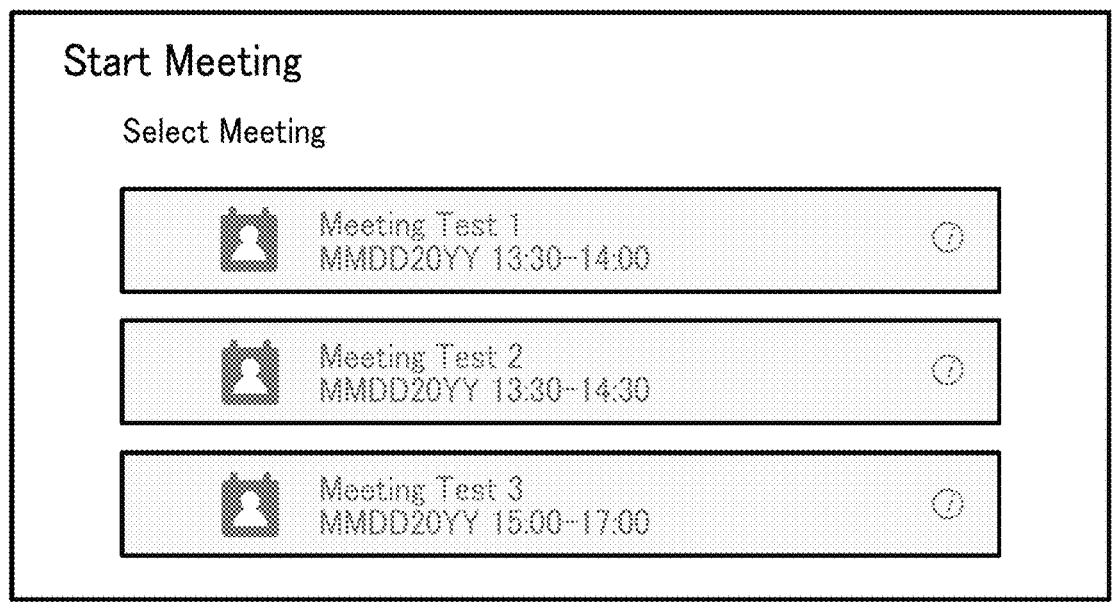
FIG. 13 is a diagram illustrating a third example of the screen displayed by the meeting support system.

FIG. 13 is a diagram illustrating a third example of the screen displayed on the meeting support system. This screen is displayed by pressing the Execute button 50 corresponding to "Start Meeting" in the menu illustrated in FIG. 11. On the screen illustrated in FIG. 13, a registered meeting name and meeting date and time are displayed so as to be selectable. On this screen, the meeting registered by the logged-in organizer is displayed. The organizer selects one of the displayed meetings and starts the meeting.

Figure 14:
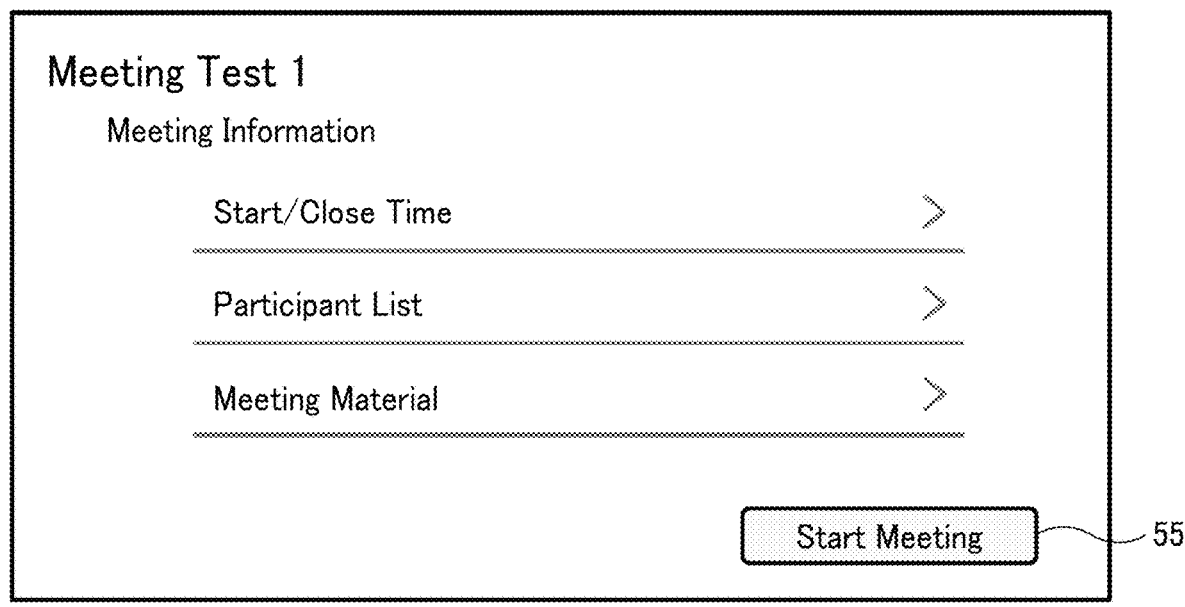
FIG. 14 is a diagram illustrating a fourth example of the screen displayed by the meeting support system.

FIG. 14 is a diagram illustrating a fourth example of the screen displayed on the meeting support system. This screen is displayed by selecting a meeting with meeting name "Meeting Test 1" in the screen illustrated in FIG. 13. On the screen illustrated in FIG. 14, "Start/Close Time", "Participant List", and "Meeting Material" are displayed as meeting information of the meeting with meeting name "Meeting Test 1". A Start Meeting button 55 is also displayed on this screen. The organizer confirms the selected meeting information and presses the Start Meeting button 55 to start the meeting.

Figure 15:
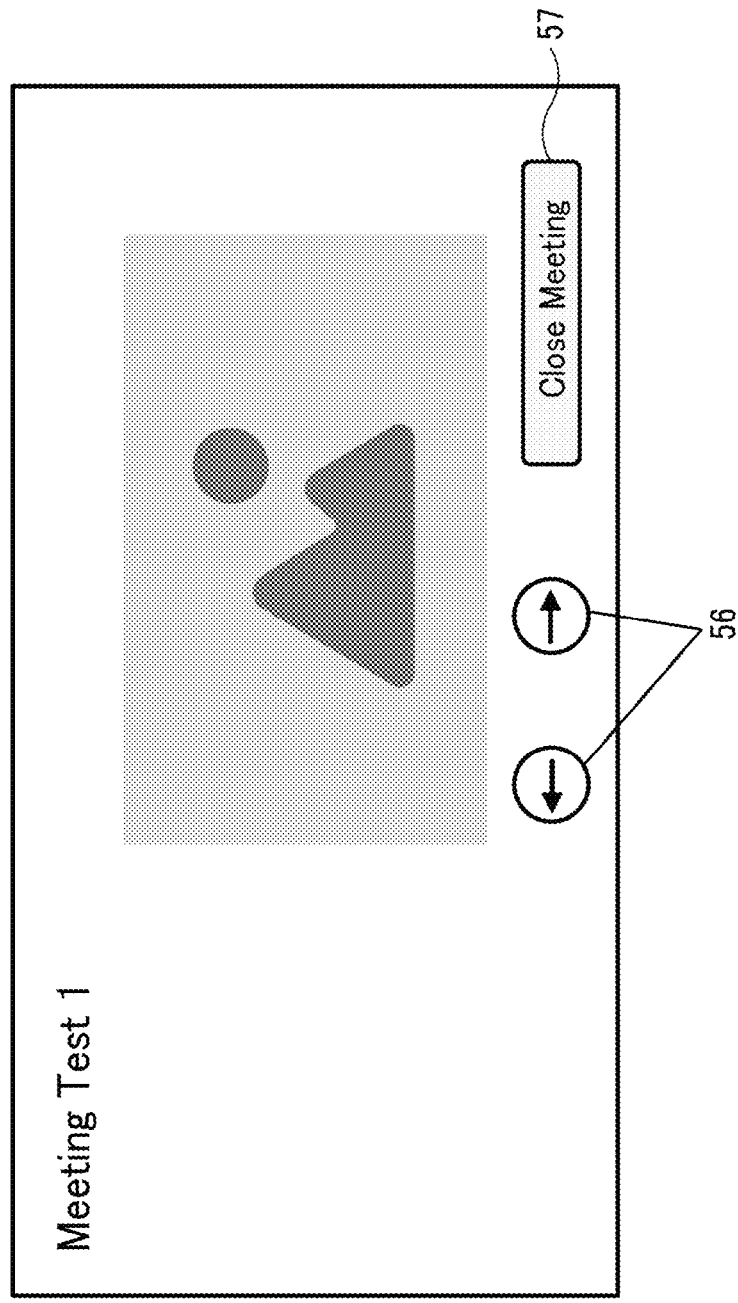
FIG. 15 is a diagram illustrating a fifth example of the screen displayed by the meeting support system.

FIG. 15 is a diagram illustrating a fifth example of the screen displayed on the meeting support system. This screen is displayed by pressing the Start Meeting button 55 on the screen illustrated in FIG. 14. The screen illustrated in FIG. 15 is a screen during the meeting, and a page of a part of the material used for presentation by the organizer is displayed. Page switching buttons 56 for changing pages and a Close Meeting button 57 are also displayed on this screen. The organizer presses the page switching buttons 56 when proceeding to a next page or returning to a previous page. The organizer presses the Close Meeting button 57 to close the meeting. When the Close Meeting button 57 is pressed, the screen returns to the top screen illustrated in FIG. 11.

Figure 16:
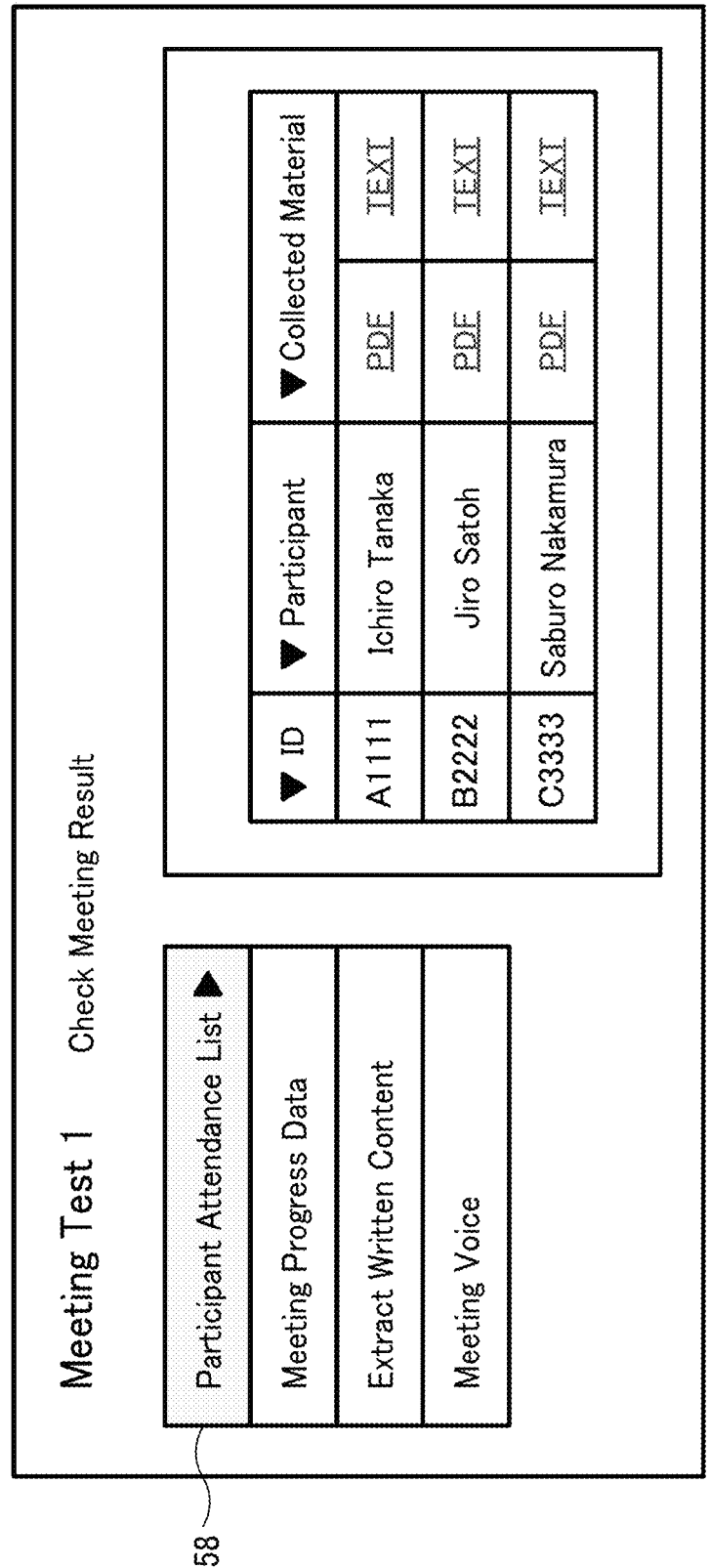
FIG. 16 is a diagram illustrating a sixth example of the screen displayed by the meeting support system.

FIG. 16 is a diagram illustrating a sixth example of the screen displayed on the meeting support system. This screen is displayed by pressing the Execute button 50 corresponding to "Check Meeting Result" in the menu of the top screen illustrated in FIG. 11 and selecting the meeting name "Meeting Test 1" on the meeting selection screen similar to the screen illustrated in FIG. 13 for selecting a meeting.

On the screen illustrated in FIG. 16, "Participant Attendance List", "Meeting Progress Data", "Extract Written Content", and "Meeting Voice" are selected from an item list 58. The organizer checks the data of various items of the meeting held. In the example illustrated in FIG. 16, the meeting result when "Participant Attendance List" is selected from the item list 58 is displayed. Participant IDs, names of participants, and links to collected material are displayed in the meeting results. The organizer confirms the participants' writing in the meeting material by selecting by clicking the link or the like. The collected material is displayed in a plurality of formats such as Portable Document Format (PDF) and text format, but the present disclosure is not limited to these formats, and may be displayed in one format or three or more formats. Further, the display of the material may be a path name indicating the storage location of the data.

Figure 17:
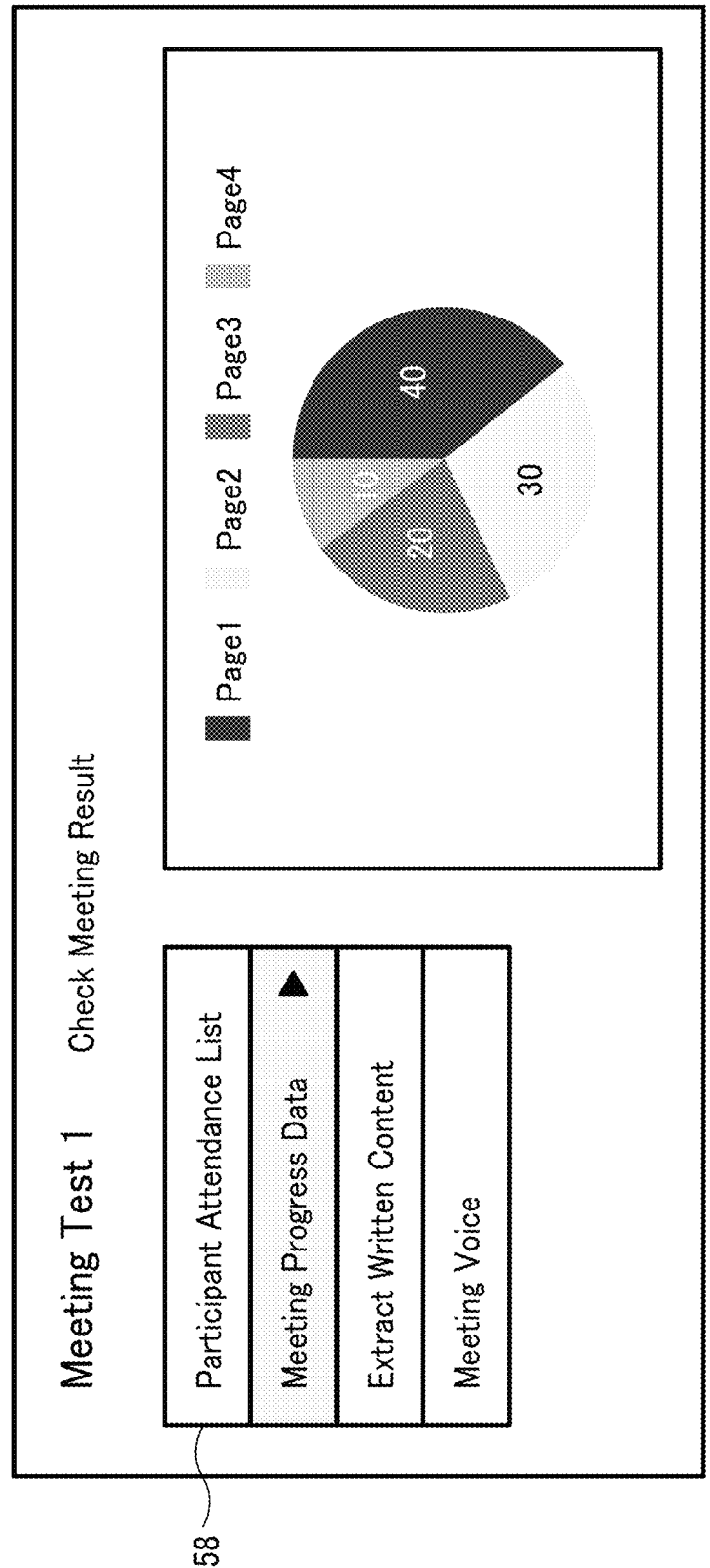
FIG. 17 is a diagram illustrating a seventh example of the screen displayed by the meeting support system.

FIG. 17 is a diagram illustrating a seventh example of the screen displayed on the meeting support system. This screen is displayed by selecting "Meeting Progress Data" from the item list 58 in the screen illustrated in FIG. 16. In the example illustrated in FIG. 17, the time spent for each page linked to the meeting material and the ratio thereof are displayed in a graph or the like, as the meeting progress data. In this example, a pie chart indicates a percentage of time spent on each page during the meeting in a case the material includes pages 1 to 4. The result indicates that a lot of time is spent on page 1.

Figure 18:
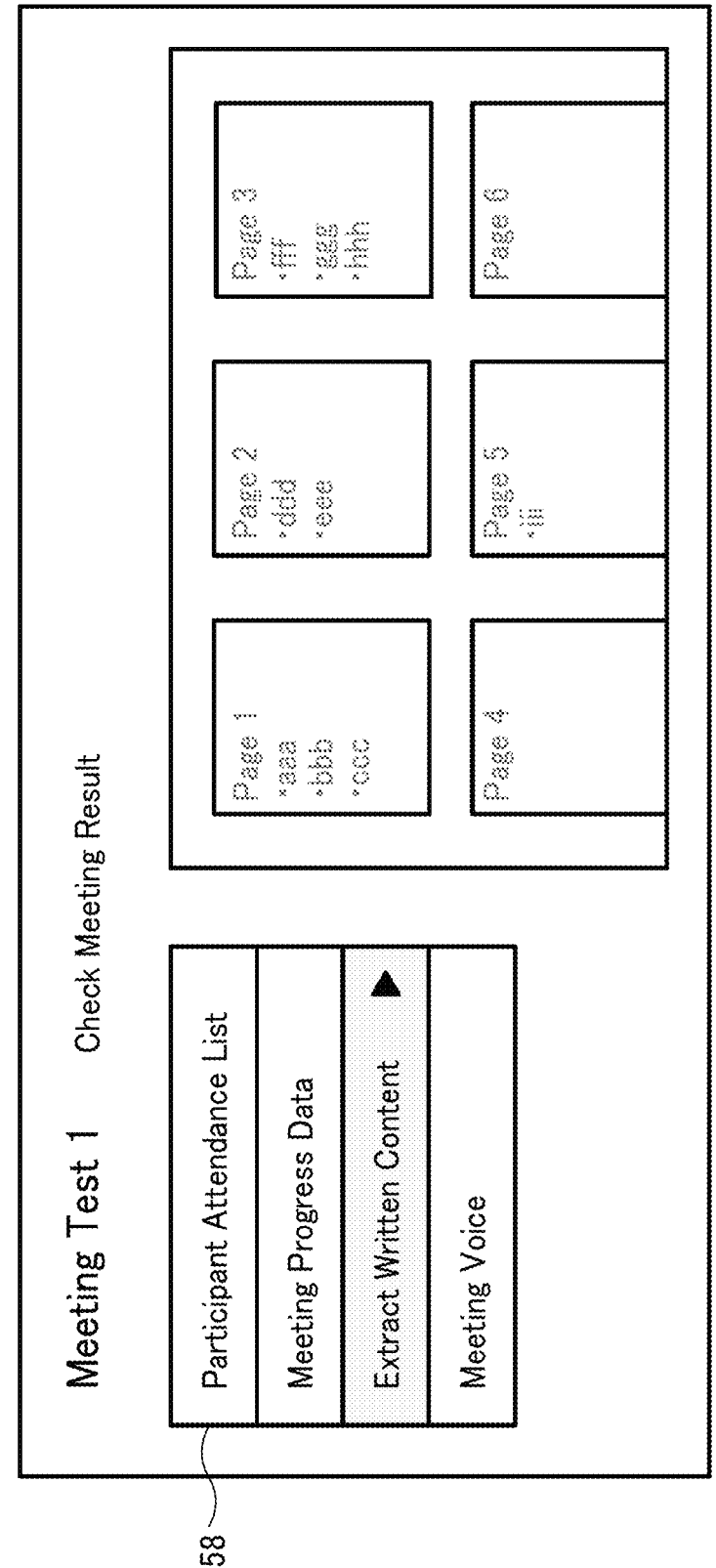
FIG. 18 is a diagram illustrating an eighth example of the screen displayed by the meeting support system.

FIG. 18 is a diagram illustrating an eighth example of the screen displayed on the meeting support system. This screen is displayed by selecting "Extract Written Content" from the item list 58 in the screen illustrated in FIG. 16. In the example illustrated in FIG. 18, the differences of pages 1 to 6 of the material are itemized by bullet points. The result indicates that there is writing on pages 1 to 3 and 5, and the content of the writing is also indicated.

Figure 19:
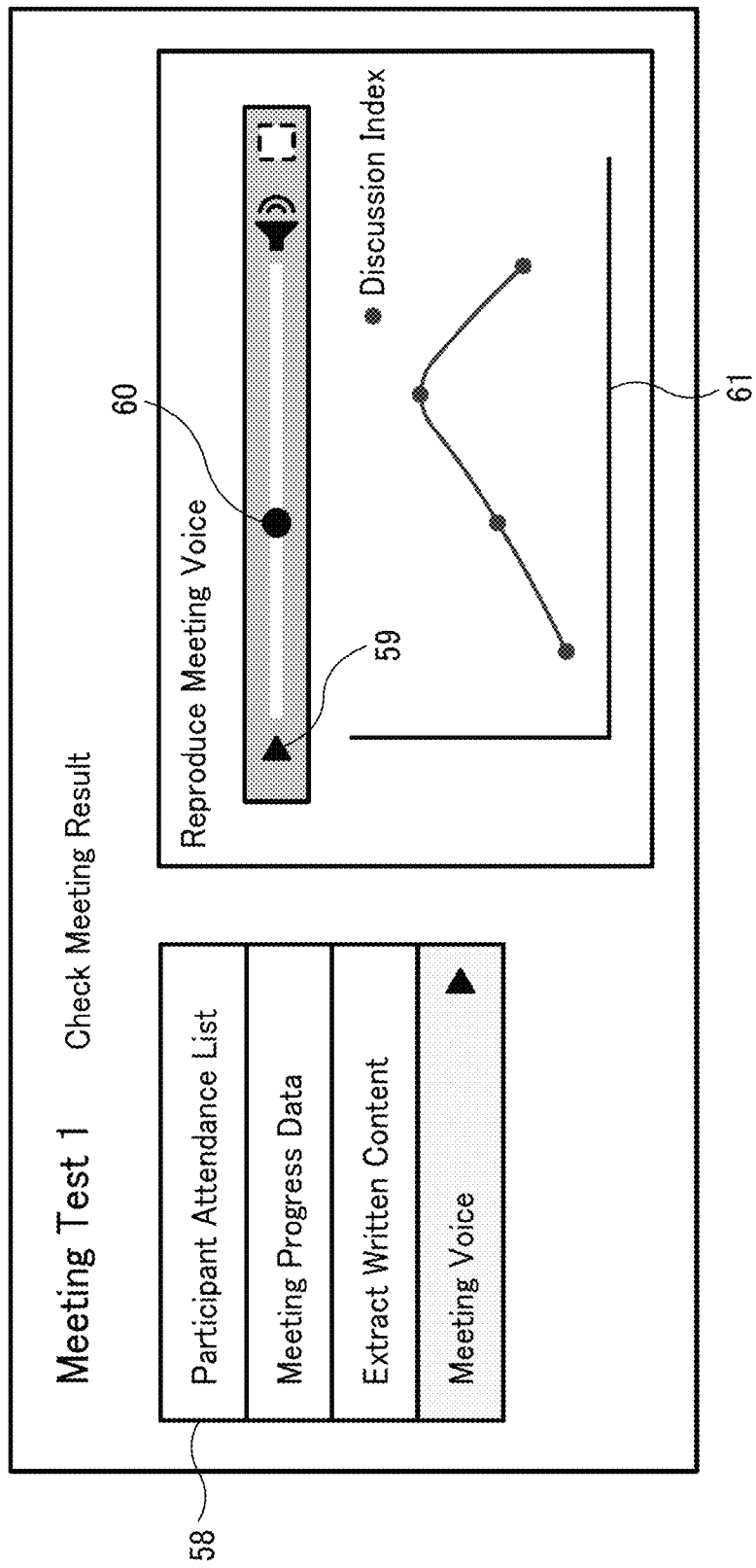
FIG. 19 is a diagram illustrating a ninth example of the screen displayed by the meeting support system.

FIG. 19 is a diagram illustrating a ninth example of the screen displayed on the meeting support system. This screen is displayed by selecting "Meeting Voice" from the item list 58 in the screen illustrated in FIG. 16. In the example illustrated in FIG. 19, a play button 59 for playing back the voice data of the meeting, an indicator 60 indicating a playback status, and a graph 61 illustrating the time of discussion on each page is displayed. Assuming that the graph 61 illustrates the time for discussion on pages 1 to 4, the graph indicates that the time for discussion on page 3 is the longest.

As described above, an example of printing material data before the meeting, distributing the printed material to the participants as meeting material, collecting the materials from the participants after the meeting, and scanning the material with a scanner to obtain the written contents is described, but the present disclosure is not limited to this example.

Figure 20:
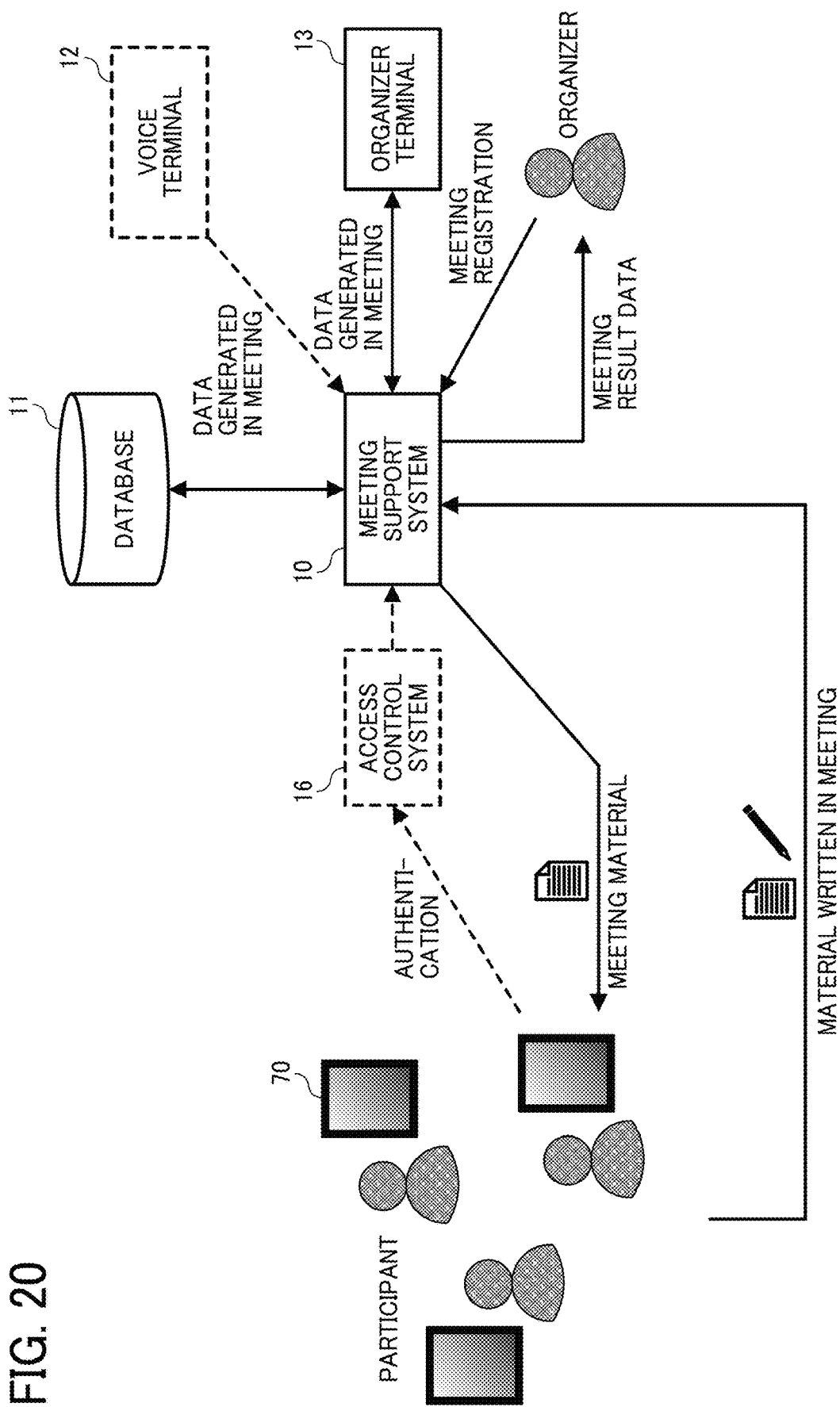
FIG. 20 is a diagram illustrating a second example of the configuration of the meeting system.

FIG. 20 is a diagram illustrating a second configuration example of the meeting system. In the example illustrated in FIG. 20, each participant possesses a communication terminal 70 such as a notebook PC or a tablet terminal, and the material data is distributed by transmitting the material data from the meeting support system 10 to the communication terminal 70. Accordingly, the material data is not printed nor distributed to the participants as a printed matter.

The participant in the meeting displays the material data on the communication terminal 70, and in a case the communication terminal 70 is a terminal equipped with a touch panel, the participant writes with a stylus pen or the like on the material. In a case the communication terminal 70 is a terminal not equipped with the touch panel, the participant of the meeting writes with a touch pad, a pointing device, a keyboard, or the like.

In this example, after the meeting is closed, instead of reading the material with the scanner, the participant sends the written material data and the meeting support system receives the material data. Since other processes are the same as those of the first configuration example illustrated in FIG. 1, the description thereof is omitted here.

As described above, by analyzing the progress of the meeting together with the content written by the participant and generate the meeting result data, the utilization of the difference information between the original material and the written material as the additional information related to the meeting is improved. Since the meeting result data is weighted based on the progress of the meeting for the differences, the reliability of the meeting result data is improved as compared with the conventional meeting result data containing just the difference information.

The above-described embodiments are illustrative and do not limit the present invention. Thus, numerous additional modifications and variations are possible in light of the above teachings. For example, elements and/or features of different illustrative embodiments may be combined with each other and/or substituted for each other within the scope of the present invention.) Any one of the above-described operations may be performed in various other ways, for example, in an order different from the one described above.

The functionality of the elements disclosed herein may be implemented using circuitry or processing circuitry which includes general purpose processors, special purpose processors, integrated circuits, application specific integrated circuits (ASICs), digital signal processors (DSPs), field programmable gate arrays (FPGAs), conventional circuitry and/or combinations thereof which are configured or programmed to perform the disclosed functionality. Processors are considered processing circuitry or circuitry as they include transistors and other circuitry therein. In the disclosure, the circuitry, units, or means are hardware that carry out or are programmed to perform the recited functionality. The hardware may be any hardware disclosed herein or otherwise known which is programmed or configured to carry out the recited functionality. When the hardware is a processor which may be considered a type of circuitry, the circuitry, means, or units are a combination of hardware and software, the software being used to configure the hardware and/or processor.

The invention claimed is:

1. An information processing apparatus comprising:
   circuitry configured to:
   register material to be distributed to a participant of a communication, the material including a plurality of parts;
   acquire progress information indicating progress of the communication and additional information added by the participant to at least one part of the plurality of parts included in the material; and
   generate result information that indicates communication result based on the material, the progress information, and the additional information,
   in response to a first instruction, display a first screen including a graph indicating a ratio of time spent for each of the plurality of parts, based on the result information, and
   in response to a second instruction, display, based on the result information, a second screen including both the additional information and identification information, the identification information identifying the at least one part where the additional information is added, the additional information being displayed in conjunction with the identification information.

2. The information processing apparatus of claim 1, wherein the circuitry is further configured to acquire the additional information from a scanner that reads the material including the additional information added by the participant.

3. The information processing apparatus of claim 1, wherein the circuitry is further configured to:
   instruct a communication terminal possessed by the participant to output the material by transmitting the material; and
   acquire the additional information by receiving the material including the additional information added by the participant from the communication terminal.

4. The information processing apparatus of claim 1, wherein the circuitry is further configured to:
   if a link to an access control system for managing access of the participant to the communication is available, instruct the output of the material including participant identification information for identifying the participant; and
   acquire the additional information identified by the participant identification information.

5. The information processing apparatus of claim 1, wherein the circuitry is further configured to:
   if a link to an access control system for managing access of the participant to the communication is available, generate a list of participant who participated in the communication and additional information added to the material by each participant as the result information.

6. The information processing apparatus of claim 1, wherein the circuitry is further configured to measure time spent for each of the plurality of parts during the communication; and acquire the time as the progress information.

7. The information processing apparatus of claim 1, wherein the circuitry is further configured to:
   acquire voice of a speaker during the communication from a voice terminal; and
   in response to a third instruction, display a third screen including a graph indicating at least one of time of speeches and number of speeches for each of the plurality of parts, based on the result information.

8. The information processing apparatus of claim 1, wherein the circuitry is further configured to:
   in response to the second instruction while the first screen is displayed, display the second screen, and
   in response to the first instruction while the second screen is displayed, display the first screen.

9. The information processing apparatus of claim 1, wherein the circuitry is further configured to:
   display, on a screen, a first button receiving the first instruction and a second button receiving the second instruction.

10. The information processing apparatus of claim 1, wherein the plurality of parts is a plurality of pages of the material.

11. A communication system comprising:
an information processing apparatus; and
an information terminal for operating material for a communication, the information processing apparatus including
circuitry configured to:
register material to be distributed to a participant of the communication, the material including a plurality of parts;
acquire progress information indicating progress of the communication and additional information added by the participant to the material; and
generate result information that indicates communication result based on the material, the progress information, and the additional information,
in response to a first instruction, display a first screen including a graph indicating a ratio of time spent for each of the plurality of parts, based on the result information, and
in response to a second instruction, display, based on the result information, a second screen including both the additional information and identification information, the identification information identifying the at least one part where the additional information is added, the additional information being displayed in conjunction with the identification information.

12. A method executed by an information processing apparatus, comprising:
registering material to be distributed to a participant of a communication, the material including a plurality of parts;
acquiring progress information indicating progress of the communication and additional information added by the participant to the material; and
generating result information that indicates communication result based on the material, the progress information, and the additional information,
in response to a first instruction, displaying a first screen including a graph indicating a ratio of time spent for each of the plurality of parts, based on the result information, and
in response to a second instruction, display, based on the result information, a second screen including both the additional information and identification information, the identification information identifying the at least one part where the additional information is added, the additional information being displayed in conjunction with the identification information.

* * * * *